United States Patent Office 2,868,864
Patented Jan. 13, 1959

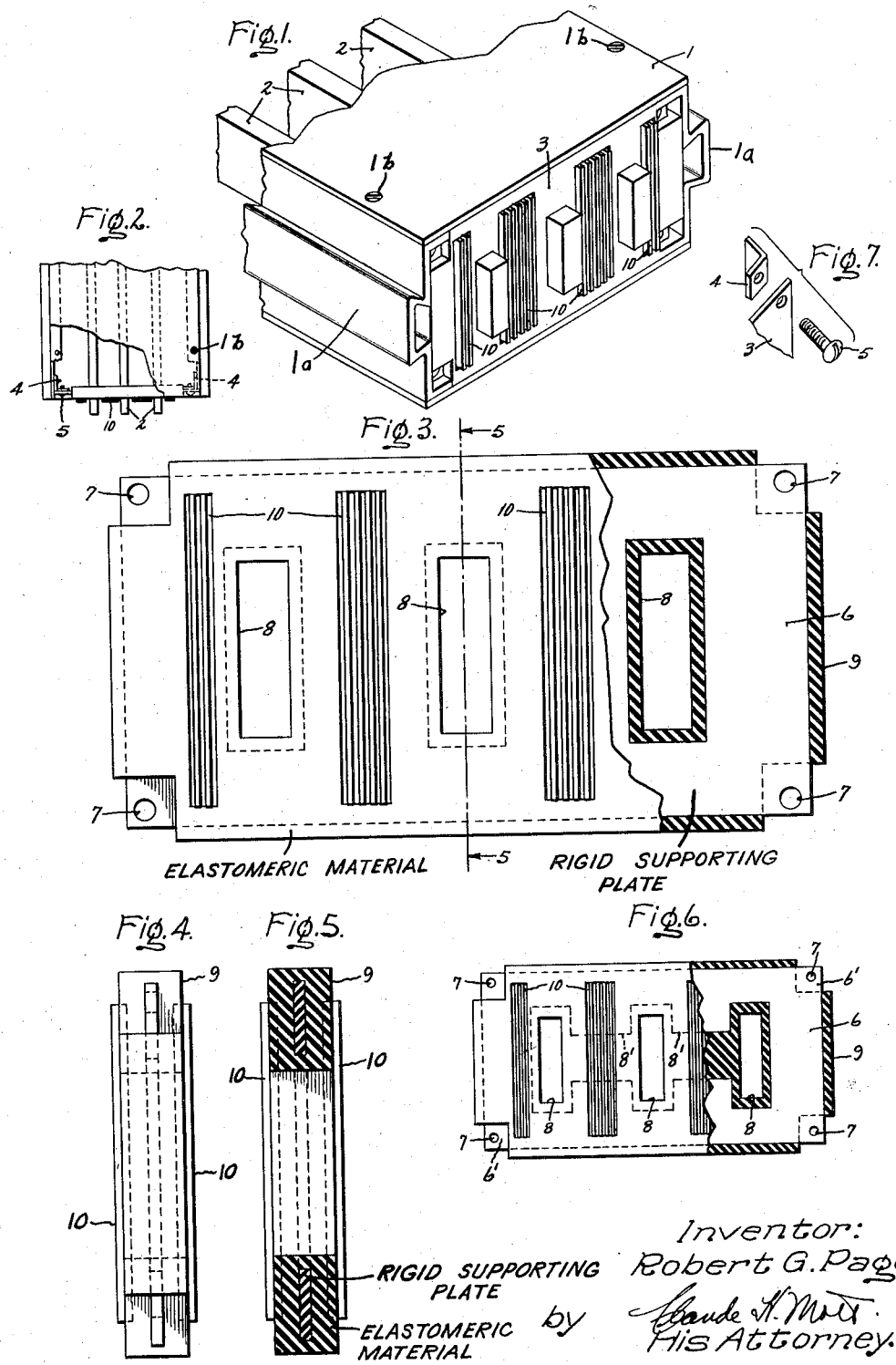

2,868,864

ENCLOSED BUS BAR ELECTRIC POWER DISTRIBUTION APPARATUS

Robert G. Page, New Britain, Conn., assignor to General Electric Company, a corporation of New York Application January 2, 1953, Serial No. 329,263

3 Claims. (Cl. 174—99)

My invention relates to enclosed bus bar electric power distribution apparatus, and more particularly to insulating spacers for positioning and supporting the bus bars in an enclosure.

Insulating spacers heretofore used have commonly been formed of ceramic or other frangible insulating material which is expensive, subject to breakage in handling and under short-circuit conditions, and of objectionable size and weight. Resilient insulating compounds have also been used for this purpose, but have been found objectionable where molded into insulating bodies, because those which are non-inflammable and non-carbonizing upon exposure to electric arcs have been found to have poor elastic recovery and aging properties.

Accordingly, it is a principal object of my invention to provide an insulating supporting spacer for enclosed bus bars in a power distribution apparatus, which spacer is inexpensive, light in weight and mechanically rugged while possessing improved electric insulating and mechanical supporting properties.

It is another object of my invention to provide an insulating spacer for bus bars which is substantially rigid in respect to forces normally applied, but is still sufficiently resilient to cushion the shock of the suddenly and normally disruptive forces due to short circuit.

A still further object of my invention is to provide an insulating spacer for bus bars in a power distribution system which provides protection against displacement of the bus bars even though the spacer is partially fractured by disruptive short-circuit forces.

In carrying out my invention in one form I provide an apertured insulating spacer comprising a substantially rigid supporting plate of metal or laminated plastic insulating material having on both sides a coating of polymerizable elastomeric insulating compound while extends around the edges of the plate and around the edges of the bus bar apertures into resilient engaging and supporting relation with the walls of an enclosure and with the bus bars. For the coating compound I utilize a plastisol or plastigel. Such material is readily molded and is polymerizable into an elastomeric mass which is non-inflammable and non-carbonizing upon contact with an electric arc, and provides a firm but resilient non-aging support for the bus bars. Plastisols and plastigels are especially effective insulation because they do not carbonize along the surface to form a conducting path when an electric arc impinges thereon. Such non-carbonizing materials are therefore known as "non-tracking."

My invention itself will be more fully understood and its various objects and advantages further appreciated by referring now to the following detailed specification taken in conjunction with the accompanying drawing, in which Fig. 1 is a fragmentary cross-sectional perspective view of an enclosed bus duct apparatus embodying my invention; Fig. 2 is a fragmentary plan view partly in section of the bus duct shown at Fig. 1; Fig. 3 is a side elevational view partly in section of the insulating spacer which is shown at Fig. 1 positioned in a duct; Fig. 4 is an end view of the insulating spacer shown at Fig. 3; Fig. 5 is a cross-sectional view taken along the line 5—5 of Fig. 3; Fig. 6 is a side elevational view partly in section of an insulating spacer embodying my invention in modified form; and Fig. 7 is an exploded fragmentary view showing in detail one form of attaching means for mounting the spacer in a duct.

Referring now to the drawing, I have shown my invention embodied in a bus duct apparatus comprising a tubular metallic enclosing duct 1 of rectangular cross-sectional configuration having positioned therein three spaced apart bus bars 2 of flat rectangular configuration disposed in flatwise spaced apart relation. Channels 1a formed on the side walls of the duct 1 provide means for suspending the duct from suitable hangers (not shown). The side walls of the duct 1 have inturned upper and lower edges to which the upper and lower walls are bolted as at 1b, Figs. 1 and 2. The bus bars 2 are positioned and supported within the duct 1 at intervals along its length by means of a plurality of apertured insulating spacer plates 3, only one of which is shown in the drawing. To mount the spacer plates 3 within the duct 1 the duct is provided internally at its corners and at each spacer location with angle brackets 4 (Figs. 2 and 7) to which the four corners of the spacer are connected, as by the bolts 5, Figs. 1, 2 and 7.

Each insulating spacer, indicated generally by the reference numeral 3, comprises an integral rectangular supporting plate 6 formed of a substantially rigid material such as metal, a laminated plastic, or molded phenolic insulating compound with or without a fabric base. This rigid supporting plate is apertured at its corners, as at 7, to provide for the mounting bolts 5. The body of the plate is provided with a plurality of spaced apart bus bar receiving apertures 8 which are larger in dimension than the cross-sectional dimension of the bus bars positioned therein. In addition, the supporting plate 6 is slightly smaller than the interior cross-sectional dimensions of the duct 1, so that the outer edges of the plate are spaced from the walls of the duct.

The rigid and fixedly mounted supporting plate 6 is substantially completely coated on both sides and around its outer edges and the edges of the oversized openings 8 with an elastomeric insulating material 9, the corners of the plate 6 being left uncoated to expose the bolt holes 7. If desired, of course, the corners of the supporting plate 6 could be coated with the insulating material 9 and aligned bolt receiving apertures provided in the coating material. The coating of elastomeric insulating material 9 is of such thickness at points where it extends around the edges of the plate 6 and through the apertures 8, that it engages the inner walls of the duct 1 and the outer walls of the bus bars 2 in resilient supporting relation.

The insulating coating 9 is elastomeric so that it provides a shockproof support for the bus bars 2, and in addition is formed of material which is non-aging, non-inflammable, electrically insulating, and non-carbonizing when exposed to an electric arc. I have found that a material eminently suitable for this purpose is a polymerizable dispersion of finely divided polyvinyl resin in a liquid plasticizer. Such materials, known as plastisols and plastigels, may be poured cold into suitable molds and converted to a solid elastomeric mass by polymerization at temperatures of the order of 350° to 400° F. These materials may be a vinyl halide resin; e. g., polyvinyl chloride, copolymers of vinyl chloride and vinyl acetate, etc. of fine particle size, homogeneously dispersed in a plasticizer for the aforesaid vinyl halide such as tricresyl phosphate, dibutyl phthalate, etc. In addition to the above ingredients, one may also incorporate in the plastisol or plastigel various polymerizable materials which in the presence of polymerization catalysts are cured to an elastomeric mass, such a composition being more particularly described in Loritsch et al., Patent 2,567,719, issued September 11, 1951. The insulating spacer described, comprising a rigid supporting plate coated with such material, preferably plastisol, serves not only to resiliently support the bus bars and effectively electrically insulate them one from the other, but provides a mounting plate which is of very appreciable strength in both compression and tension thereby to resist deformation or destruction of the insulator under the forces of magnetic repulsion encountered in the event of a short circuit.

In order to increase the length of the creepage path and thus inhibit arcing between the bus bars, I preferably provide on opposite surfaces of the elastomeric insulating coating 9 a plurality of fluted areas 10, the flutes being disposed between adjacent bus bars and between the outer bus bars and the side walls of the duct and extending in directions transverse to the direction which an electric arc between the live parts would take. With respect to the bus bars themselves, the flutes extend in directions perpendicular to lines between the centers of adjacent bus bars. As indicated more clearly at Figs. 4 and 5, the flutes are formed as longitudinal embossments on the surface of the coating extending in parallel spaced relation with grooves or depressions therebetween.

The embodiment of the invention shown at Figs. 1–5 inclusive, wherein the bus bar receiving apertures 8 in the supporting plate 6 are discrete and not interconnected, is suitable for use in conjunction with a spacer formed upon a rigid supporting plate 6 of electric insulating material. Where the rigid supporting plate 6 is to be formed of metal, it is necessary that circulating current paths circumferential to the individual bus bars be avoided. For this purpose I have illustrated at Fig. 6 another embodiment of my invention, wherein the supporting plate 6' is formed of metal and the discrete bus bar receiving apertures 8 disposed in spaced apart relation are interconnected by cutting away the metal plate 6' between these apertures as at 8'.

In practice I have found that an insulating spacer embodying my invention, even when exposed to short-circuit forces sufficient to fracture the rigid supporting plate 6, will still, by reason of the strength of the plastisol mass 9, support the bus bars in proper relative position and prevent their contacting each other.

While I have described only certain preferred embodiments of my invention by way of illustration, many modifications will occur to those skilled in the art, and I therefore wish, to have it understood that I intend in the appended claims to cover all such modifications as fall within the true spirit and scope of my invention.

What I claim as new and desire to secure by Letters Patent of the United States is:

1. Enclosed bus bar electric power distribution apparatus comprising an elongated enclosure of generally rectangular cross-section, a plurality of electric power bus bars in said enclosure, means supporting said bus bars in parallel spaced-apart relation in said enclosure including a plurality of longitudinally spaced insulators, each of said insulators comprising a generally rectangular body of elastomeric insulation material and a plate of relatively rigid high strength material embedded therein, said plate being generally rectangular in outline and having its corner portions projecting out of said body of elastomeric material, an aperture in each of said corner portions of said plate, means fixedly mounting said plate to said enclosure transversely thereof including fastening means passing through said corner apertures, said body of elastomeric material having a plurality of relatively large apertures generally centrally thereof, said bus bars passing through said apertures respectively, said plate also having a plurality of relatively large apertures generally centrally thereof corresponding to said apertures in said body but larger than said body apertures, and said elastomeric body fitting relatively closely within the interior of said enclosure, whereby said bus bars are securely supported against movement due to high short-circuit current forces, and said insulator also serves as a stop to prevent air flow through said enclosure past said insulator.

2. Enclosed bus bar electric power distribution apparatus as set forth in claim 1 wherein said plate comprises metallic material.

3. Enclosed bus bar electric power distribution apparatus as set forth in claim 2 wherein said plate includes cut-away portions intercommunicating with each pair of adjacent ones of said relatively large apertures whereby none of said bus bars is individually surrounded by a closed loop of said plate material.

References Cited in the file of this patent

UNITED STATES PATENTS

| | | |
|---|---|---|
| 964,737 | Ashley | July 19, 1910 |
| 1,256,643 | Barfoed | Feb. 19, 1918 |
| 2,183,811 | Homan | Dec. 19, 1939 |
| 2,341,841 | Carlson | Feb. 15, 1944 |
| 2,605,365 | Becker | July 29, 1952 |
| 2,611,002 | James | Sept. 16, 1952 |
| 2,733,289 | Warren et al. | Jan. 31, 1956 |
| 2,738,445 | Hammerly et al. | Mar. 13, 1956 |